United States Patent
Rizzi

(10) Patent No.: US 10,960,374 B2
(45) Date of Patent: Mar. 30, 2021

(54) CHEMICAL REACTOR WITH ADIABATIC CATALYTIC BEDS AND AXIAL FLOW

(71) Applicant: CASALE SA, Lugano (CH)

(72) Inventor: Enrico Rizzi, Casnate con Bernate (IT)

(73) Assignee: CASALE SA, Lugano (CH)

( * ) Notice: Subject to any disclaimer, the term of this patent is extended or adjusted under 35 U.S.C. 154(b) by 0 days.

(21) Appl. No.: 16/762,428

(22) PCT Filed: Nov. 6, 2018

(86) PCT No.: PCT/EP2018/080270
§ 371 (c)(1),
(2) Date: May 7, 2020

(87) PCT Pub. No.: WO2019/101505
PCT Pub. Date: May 31, 2019

(65) Prior Publication Data
US 2020/0261876 A1    Aug. 20, 2020

(30) Foreign Application Priority Data
Nov. 21, 2017 (EP) ..................................... 17202844

(51) Int. Cl.
*B01J 8/04*    (2006.01)
(52) U.S. Cl.
CPC ........... *B01J 8/0453* (2013.01); *B01J 8/0492* (2013.01); *B01J 8/0496* (2013.01);
(Continued)
(58) Field of Classification Search
CPC ...... B01J 8/0453; B01J 8/0492; B01J 8/0496; B01J 8/048; B01J 2208/00194;
(Continued)

(56) References Cited

U.S. PATENT DOCUMENTS

| | | | | |
|---|---|---|---|---|
| 3,307,921 A | * | 3/1967 | Junginger | .............. B01J 8/0496 422/148 |
| 5,756,048 A | | 5/1998 | Zardi et al. | |

FOREIGN PATENT DOCUMENTS

| | | |
|---|---|---|
| NL | 9500080 A | 9/1995 |
| WO | 2004067160 A2 | 8/2004 |

(Continued)

OTHER PUBLICATIONS

International Preliminary Report on Patentability for International Application No. PCT/EP2018/080270 completed Jan. 3, 2020.
(Continued)

*Primary Examiner* — Lessanework Seifu
(74) *Attorney, Agent, or Firm* — Dorsey & Whitney LLP

(57) ABSTRACT

Axial reactor for exothermic or endothermic chemical reactions, comprising at least a first catalytic bed and a second catalytic bed operating in series and at least one heat exchanger between the two catalytic beds, wherein the first catalytic bed has a collector bottom having a box-like structure with flat and parallel walls, which are gas-permeable, and a plurality of parallel channels defined between the walls, wherein a first series of said channels collects the gaseous flow exiting the catalytic bed and passing through the first wall, said gaseous flow is directed towards the heat exchanger, and the flow exiting the exchanger is directed towards the second catalytic bed via a second series of said channels of the collector bottom.

15 Claims, 5 Drawing Sheets

(52) U.S. Cl.
CPC ............ *B01J 2208/00194* (2013.01); *B01J 2208/00212* (2013.01); *B01J 2208/00884* (2013.01); *B01J 2208/00938* (2013.01)

(58) Field of Classification Search
CPC .... B01J 2208/00212; B01J 2208/00884; B01J 2208/00938
See application file for complete search history.

(56) References Cited

FOREIGN PATENT DOCUMENTS

| | | |
|---|---|---|
| WO | 2009019045 A1 | 2/2009 |
| WO | 2009078490 A1 | 6/2009 |
| WO | 2013119318 A1 | 8/2013 |

OTHER PUBLICATIONS

International Search Report from International Application No. PCT/EP2018/080270 dated Jan. 25, 2019.

* cited by examiner

CHEMICAL REACTOR WITH ADIABATIC CATALYTIC BEDS AND AXIAL FLOW

FIELD OF APPLICATION

The invention relates to the technical field of catalytic chemical reactors. The invention relates in particular to the field of reactors with adiabatic catalytic beds and axial flow.

PRIOR ART

Adiabatic multi-bed catalytic reactors are defined as such because they do not directly supply or remove inside the catalytic beds. Consequently the temperature of a gaseous flow of reagents and products (process flow) may vary significantly through each catalytic bed depending on the exothermic or endothermic nature of the reaction. In many applications of interest, including for example ammonia synthesis and methanol synthesis, the chemical reactions involved are exothermic, which means that the gaseous flow heats up significantly when passing through each catalytic bed. In general, this requires cooling of the flow before entrance in the subsequent bed in order to prevent overheating.

Multi-bed or inter-cooled reactors are used for example for the ammonia or methanol synthesis. Cooling of the process flow is generally associated with a heat recovery operation. For example, in some applications, the process flow releases heat to a flow of boiling water, producing steam which can be used for process or energy purposes.

A reactor of the abovementioned type requires internal components for gas collection and distribution which are able to: collect the gas flowing out from a first catalytic bed, convey it to a heat exchanger located inside the said reactor, collect the gas exiting said exchanger, distribute the gas to a second catalytic bed operating downstream of the first catalytic bed. In reactors comprising a greater number of catalytic beds, for example three or four, these components are generally required also between other pairs of beds arranged in series, for example between the second bed and the third bed and optionally also between the third bed and the fourth bed.

These internal components must ensure fluid-tightness and prevent bypassing of the gas; they must withstand a significant thermal stress; they must be small in size because the space inside the reactor is limited and any component which occupies space which would be useful for the catalyst is disadvantageous. Moreover, it must be ensured that the gas does not follow a long path and/or a path with many deviations so as to avoid excessive pressure drop. Another requirement is that of feeding the catalytic beds in a uniform manner so as to make suitable use of the available catalyst. In some processes, for example methanol synthesis, if the gas is not uniformly distributed in the catalytic bed, undesirable chemical reactions may occur, with the formation of by-products which reduce the purity and therefore the commercial value of the product. In axial reactors, moreover, it is necessary to avoid transverse speed components of the gas with respect to the bed, which may displace the catalyst particles in an undesirable manner, resulting in accumulations which in turn negatively influence the gas distribution inside the catalytic bed.

Yet another requirement is an easy assembly/disassembly of the reactor interiors both for the purposes of maintenance and of revamping of existing reactors. In this latter case, it is preferable that the components for collecting and distributing the gas can be introduced also through an opening having a diameter substantially smaller than the diameter of the reactor itself, so that revamping is applicable to partially open reactors.

It can be understood, therefore, that the gas collection and distribution in inter-cooled multi-bed reactors gives rise to technical difficulties not easy to overcome.

In the prior art different solutions have been adopted depending on the flow passing through the catalytic beds, which may be axial, radial or mixed axial-radial.

In radial or axial-radial reactors a cylindrical heat exchanger (for example a tube bundle) is commonly used inside an annular catalytic bed. The gas collection and distribution is performed by cylindrical gas-permeable walls or wall systems. This constructional solution is particularly suitable for the radial flow and has numerous advantages, even though the construction of the cylindrical gas-permeable walls is relatively costly.

In axial-flow reactors, which are of interest for the purposes of the present invention, the beds normally have a cylindrical shape and are vertically arranged in a column one above another inside a vessel or a vertical cartridge. In general the beds are passed through by the gas from the top downwards.

With this configuration, the arrangement of a heat exchanger between the beds and, in particular, the provision of a suitable gas collection and distribution system between the beds is difficult.

In particular, in the prior art there is no advantageous, small-size and low-cost solution for collecting the effluent from the first bed, conveying the gas to a heat exchanger, collecting the gas exiting said exchanger, and redistributing it uniformly inside the second underlying bed.

Therefore, in axial reactors, heat exchange by means of direct mixing is preferred since it is easier to implement. For example, a hot effluent from the first bed is mixed with a suitable quantity of fresh reagent gas or recirculated gas at lower temperature. The mixing process lowers the temperature of the gas before its introduction into the second bed. This technique is referred to as "quench" technique.

The "quench" technique is widely used, but has the drawback of altering the composition of the gas, for example by diluting it. Moreover, it has the drawback of not allowing the heat recovery with a useful effect, for example the steam production.

The prior art does not offer a convenient solution for providing an axial reactor with indirect inter-bed heat exchange, for example where the process gas is cooled inside a boiler and steam is produced. This has been an obstacle hitherto to the widespread use of axial reactors. This is disadvantageous because axial reactors have a number of attractive characteristics: they are simple and low-cost, since they have no cylindrical collectors which account for a substantial part of the cost of the interiors, they are reliable, they have low pressure drop, they are suitable for a high splitting up of the catalytic beds, for example 4 or 5 beds may be formed, which is more difficult in radial reactors. However, the difficulties in achieving convenient heat recovery or steam production have discouraged the designers so far from adopting the configuration of an inter-cooled axial reactor.

WO 2009/019045 discloses a small chemical reactor made of a reaction duct containing a catalyst and featuring heat exchange means adapted to exchange heat with the reagents in their transit through the reaction duct. The exchange means are in the form of serpentine tubes each contained in a small space along the duct, separated from the catalyst by diffuser partitions. The heat that can be exchanged by said serpentine tubes however is very limited.

SUMMARY OF THE INVENTION

The invention aims to solve the problems and the drawbacks of the prior art indicated further above. In particular, the invention deals with the problem of how to perform gas collection and distribution between consecutive catalytic beds in a chemical reactor of the multi-bed type with inter-bed heat exchange, in an efficient manner, at low cost and with apparatuses having limited dimension. More in particular, the invention relates to intercooled multi-bed axial reactors; even more specifically, the invention relates to reactors for ammonia or methanol synthesis.

Said problem is solved with a reactor according to the attached claims.

The reactor comprises a stack of axially aligned catalytic beds including at least one first catalytic bed and a second catalytic bed operating in series with axial flow, and at least one heat exchanger between the two beds. A gas flow exiting the first catalytic bed is heated or cooled in the heat exchanger and subjected to a further reaction stage in the second catalytic bed. The stack of catalytic beds is also termed catalytic stack.

The catalytic beds are placed one next to the other in the axial direction, which is also the predominant direction of the gaseous flow traversing the catalytic beds (axial flow). For example the catalytic beds are placed one above the other in a vertical reactor.

Said at least one heat exchanger is located sideways the catalytic stack. Accordingly, said heat exchanger is not axially stacked with the catalytic beds. The at least one heat exchanger may be inside or outside the reactor, that is inside or outside a pressure vessel containing the stack of catalytic beds. A design with the heat exchanger inside the reactor is preferred.

The reactor is characterized in that the first catalytic bed has a collector bottom having a box-like structure comprising a first wall and a second wall spaced and parallel with respect to each other, and a plurality of parallel channels which are defined between said two walls.

The first wall is exposed to the flow exiting the first catalytic bed, and the second wall communicates with a gas inlet of the second catalytic bed; said first wall and said second wall are also gas-permeable at least over part of their surface.

Said plurality of parallel channels comprises first channels which are in direct communication with the first wall so as to collect the gaseous flow exiting said first catalytic bed and passing through the first wall, and second channels which are in direct communication with the second wall so as to distribute a gaseous flow in said second catalytic bed through the second wall.

The heat exchanger is an indirect heat exchanger with one side traversed by the gaseous flow exiting the first catalytic bed, said side having an inlet communicating with the first channels of the collector bottom and an outlet communicating with the second channels thereof, so as to heat or cool the gaseous flow collected by the first channels and feed the heated or cooled flow to the second channels.

The reactor includes a suitable piping to connect the heat exchanger to said first channels and second channels of the collector bottom.

Said collector bottom is basically a combined component which, in addition to the structural function as bottom of the first catalytic bed, it acts as collector of the gas exiting the bed and as distributor (feeder) of the gas into the subsequent bed. The first channels behave substantially as gas collectors, collecting the gas exiting the first catalytic bed. The second channels behave substantially as gas collectors (distributors) feeding the second catalytic bed. In the present description the term collector bottom is used for the sake of brevity, although the component acts both as collector and as distributor.

Preferably the first channels and the second channels are alternated with respect to each other, i.e. a first channel is arranged alongside a second channel and vice versa.

Advantageously the collector bottom comprises a core element sandwiched between said first and second walls. Said core element has a wave configuration provided with crests which are joined alternately to the first wall and to the second wall, defining the internal parallel channels.

In a preferred embodiment, the first wall is directly in contact with the catalyst of the first bed (forming the bottom thereof) and therefore is directly exposed to a flow of gas exiting the first catalytic bed in an axial direction, while the second wall faces a gas inlet of the second catalytic bed.

Advantageously said first wall comprises or consists of a flat metal sheet, said second flat wall similarly comprises or consists of another flat metal sheet, and the core element comprises an undulated or corrugated metal sheet. The preferred thickness for said metal sheets ranges from 3 mm to 10 mm. The sandwich-like design with three metal sheets is advantageous, being simple, light and low-cost.

The core element is joined respectively to the first wall and to the second wall along longitudinal junction lines. The joining may be performed by means of welding or riveting or using removable connecting elements such as bolts. According to a preferred embodiment a laser weld is performed along longitudinal junction lines between flat and parallel surfaces which can be welded together by means of an automatic laser welding process.

In preferred embodiments, said core element is a load-bearing element of the collector bottom.

It has to be noted that the box-like collector bottom of the present invention may have a load-bearing function. The load transferred to the collector bottom includes the weight of the catalyst above the collector bottom and the load generated by the difference of pressure (delta-p) of the axial gaseous flow. The above loads are relevant, particularly in a large reactor with a diameter greater than 1 m. Large ammonia reactors may have a diameter of 5 to 6 m and up to 7 m; the stress on collector bottoms is therefore very relevant.

Accordingly, a bottom of a catalytic bed of a large reactors needs relatively large structural elements, for example supporting beams, which inevitably takes away some room. One of the advantages of the invention is that the unavoidable room occupation of the bottom of a catalytic bed is exploited to provide a collection of the incoming flow toward the inter-bed heat exchanger and a collection of the heated or cooled flow coming from the same heat exchanger.

In a preferred embodiment, the height of the sandwiched collector (distance between the first wall and second wall) is not greater than 300 mm in a reactor having a diameter up to 6 meters.

The first flat wall and the second flat wall are made gas-permeable using a construction technique known per se, for example the walls comprise openings, such as holes, micro holes or slots, suitable for allowing the gas to pass through.

In a particularly preferred embodiment, said parallel channels have an essentially triangular or trapezoidal cross-section. More advantageously, the base of the triangular or trapezoidal section of a channel corresponds to a gas-permeable strip of the first or second wall, thus ensuring that the channel is in direct communication with the first catalytic bed or the second catalytic bed, respectively.

Preferably, said parallel channels extend in a longitudinal direction which is in a perpendicular plane with respect to the axis of the reactor. Consequently, in a vertical-axis reactor, the parallel channels are located at the same height inside the reactor itself.

A preferred configuration provides for: collecting the gas leaving the first bed and feeding said gas to the first channels on one side of the collector bottom; feeding the gas to the second bed on an opposite side of the collector bottom. This allows optimizing the piping inside the reactor and managing the incoming and outgoing flows in a better manner.

In some embodiments the collector bottom has a modular structure, i.e. is formed by a plurality of modules. Each module comprises a given number of said parallel channels, and the collector bottom is formed by two or more of said modules arranged side-by-side. More advantageously, each module is self-supporting. The adjacent modules of the collector bottom may be fixed together by one or more flat elements, for example metal sheets, which form portions of the first wall or the second wall.

In a further embodiment, the collector bottom comprises perforated tubes in at least one of the first channels and the second channels. More preferably the perforated tubes are located inside the second channels.

The heat exchanger is an indirect exchanger, i.e. operates with two fluids flowing along two respective sides of the exchanger without mixing together. The heat exchanger comprises a shell and a series of heat exchange bodies such as tubes or plates. One side of the exchanger is formed by the inside of said bodies and the other side is formed by the volume of the shell around said bodies.

A suitable heating or cooling medium flows through one side of the heat exchanger.

Being located sideways the catalytic stack, the exchanger is arranged off-centre with respect to the axis of the reactor. In the plate-type exchanger, the heat-exchange bodies are essentially flat bodies, having a small thickness compared to the length and width.

In a reactor according to the invention, the catalytic beds may comprise the same catalyst or catalysts of different kind, depending on the requirements.

A reactor according to the invention may comprise a plurality of collector bottoms, of the type described above, which are arranged between respective pairs of adjacent catalytic beds. The gas leaving the collector bottom of the last bed is sent to the reactor output, optionally after a further heat exchange.

The invention offers many advantages, some of which are described below.

A first advantage is that the gas is collected and distributed in a single apparatus, i.e. inside the combined member, with a simple and low-cost structure. Said combined member may be realized essentially with three low-cost components, i.e. two flat metal sheets and a corrugated metal sheet to form the inner core. The combined member is light, but also resistant owing to the ribbing effect of the inner core. Therefore, it may be used as the bottom of a catalytic bed, being able to support the weight and the pressure thrust of the bed itself.

A main advantage of the invention is that the combined collector/distributor member is compact and does not require complex piping for managing the gas flows. Therefore, the invention is able to apply the inter-cooling technique also to axial reactors and combine the greater constructional simplicity of the latter with the advantages which hitherto were associated only with radial or axial-radial reactors.

The combined member of the invention distributes the gas entering the subsequent bed in a uniform manner and without horizontal speed components. This aspect allows keeping the distance between two beds as small as possible, thus favourably influencing the degree of filling which is defined as the ratio between the volume of loaded catalyst and the internal volume of the apparatus. Increasing the degree of filling means leads to a more compact and less expensive apparatus with the same performance.

The use of laser welding offers further advantages: the laser technique may be performed without a welding rod, resulting in a good dimensional precision. Dimensional precision means minimum thermal distortion. Moreover, the production process with laser welding is completely automated and reduces the production costs.

Another advantage is the possibility of revamping existing apparatuses by inserting a collector/distributor member according to the invention. This allows, for example, to revamp the interiors, thus recovering useful space for the catalyst and/or converting a quench reactor into an inter-cooled reactor. The revamping is further facilitated by the modular design. More advantageously, self-supporting modules also allow revamping partially open reactors.

The trapezoidal cross-section of the channels is such that a large gas through-flow area may be obtained for the channels.

The presence of perforated tubes inside the channels offers the further advantages of ensuring a uniform distribution of the gas along the channels and reducing the parasitic heat exchange between the adjacent channels.

The off-centre (decentered) arrangement of the heat exchanger provides a series of reactor configurations which will be described below with some examples. The invention therefore also has the advantage of providing an increased flexibility in the chemical reactor design.

The advantages of the invention will emerge even more clearly with the aid of the detailed description below relating to a number of preferred embodiments.

DETAILED DESCRIPTION OF PREFERRED EMBODIMENTS

Figure 1:
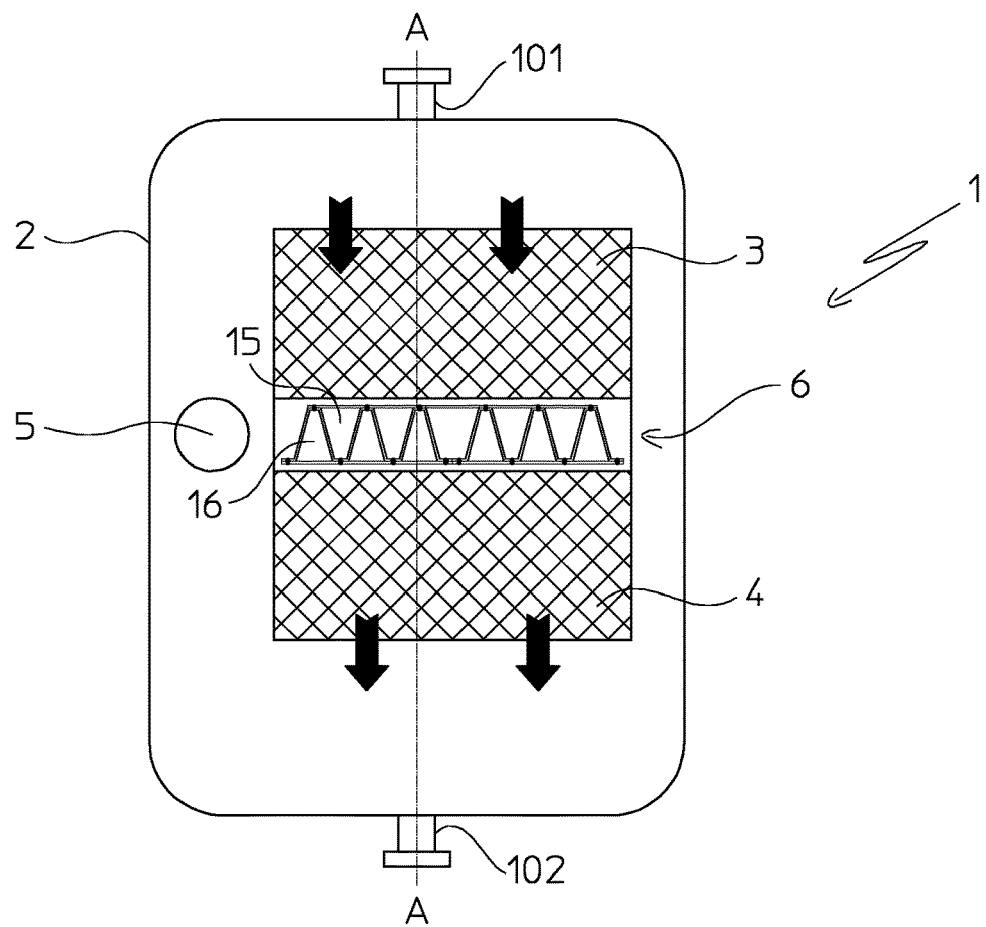
FIG. 1 shows a schematic cross-section of a reactor comprising two catalytic beds and a collector bottom, in one embodiment of the invention.

FIG. 1 shows in schematic form an axial-flow reactor 1 essentially comprising a shell 2, a first catalytic bed 3, a second catalytic bed 4. The shell 2 further contains a heat exchanger 5. The first catalytic bed 3 has a collector bottom 6 which will be described below.

The reactor 1 for example is a vertical reactor with axis A-A.

In some embodiments the catalytic beds are housed inside a cartridge.

The beds 3 and 4 operate in series. A fresh (gaseous) feed enters the reactor 1 via a flange 101, flows axially through the first bed 3 from the top downwards in the direction indicated by the arrows; a gaseous flow exiting the first bed 3 (partially converted) is directed into the heat exchanger 5 and, once cooled or heated, enters the second bed 4 for completion of the conversion process. The second bed 4 is also axially passed through, as indicated by the arrows. The reaction products leave the reactor 1 via the flange 102.

The catalytic beds 3 and 4 are stacked one above the other with the collector bottom in between. The heat exchanger 5 is placed laterally outside the stack.

The collector bottom 6 has a plurality of parallel channels 15 and 16 which establish communication between the two catalytic beds 3, 4 and with the heat exchanger 5, as will be explained below.

The collector bottom 6 (FIG. 2) essentially comprises a first wall 10 and a second wall 11 and a core element 12 sandwiched in between the walls 11 and 12.

The two walls 10, 11 are flat and parallel, suitably spaced from each other. Said two walls 10, 11 are also gas-permeable at least over part of their surface.

The first wall 10 is exposed to the gas flow exiting the first catalytic bed 3; the second wall faces a gas inlet of the second catalytic bed 4.

The core element 12 has a wave configuration with crests 13 which are joined alternately to the first wall 10 and the second wall 11 along welding lines 14.

The so arranged core element 12 defines a series of parallel channels between the walls 10 and 11, inside the collector bottom 6. More particularly, the following are defined:

first channels 15 which communicate with the first catalytic bed 3 via permeable surfaces 17 of the wall 10, so as to collect the gaseous flow exiting the first bed 2;

second channels 16 which communicate with the second catalytic bed 4 so as to distribute a gaseous flow in said second bed 14 via permeable surfaces 18 of the wall 11.

The surfaces 17 and 18 represent permeable zones of the walls 10 and 11. Said permeable zones may be formed, for example, as longitudinal strips, as shown in the figures. It can noted that the regions around the crests 13 and the respective welds 14, instead, are not permeable.

The heat exchanger 5 is an indirect exchanger with two sides not in communication with each other. Said two sides may be for example a shell side and an inner tube or plate side. One of the sides of the exchanger 5 is crossed by the process gas of the reactor 1 and has an inlet communicating with the first channels 15 and an outlet communicating with the second channels 16.

Figure 2:
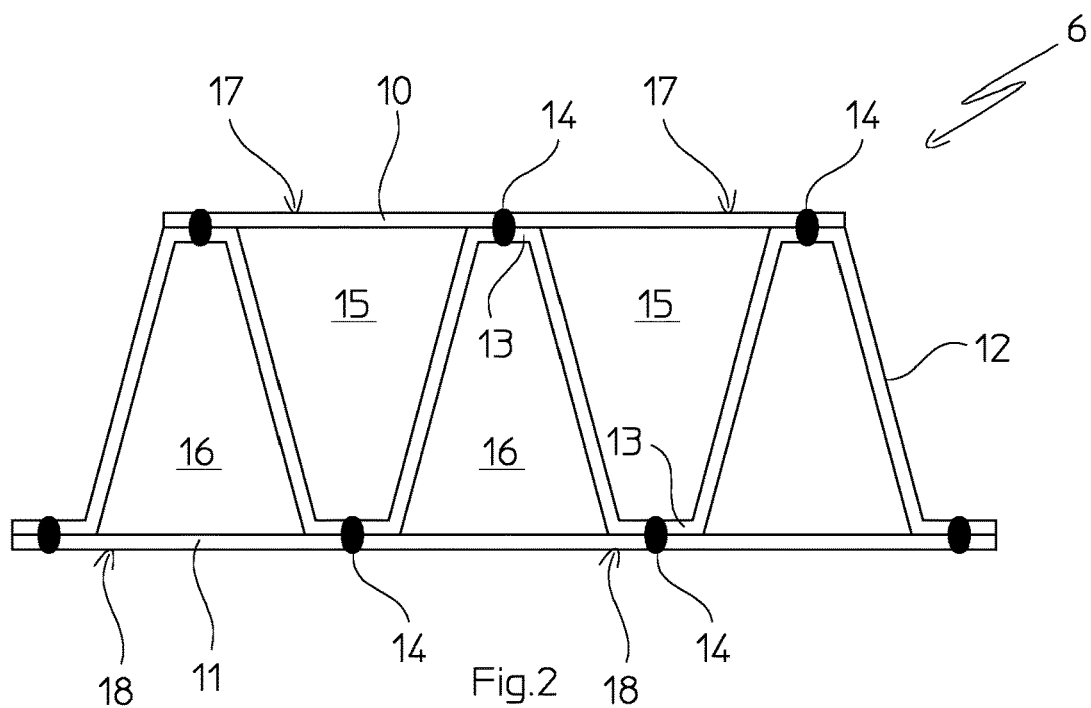
FIG. 2 shows a schematic cross-section of the collector bottom of the reactor according to FIG. 1.

Observing FIGS. 1 and 2 it can be understood that the gas flow exiting the bed 3 is collected solely inside the first channels 15, passing through the permeable surfaces 17; said channels 15 feed the heat exchanger 5. The gas exiting the heat exchanger 5 enters the second channels 16 and passes into the underlying second bed 4 through the permeable surfaces 18.

Figure 3:
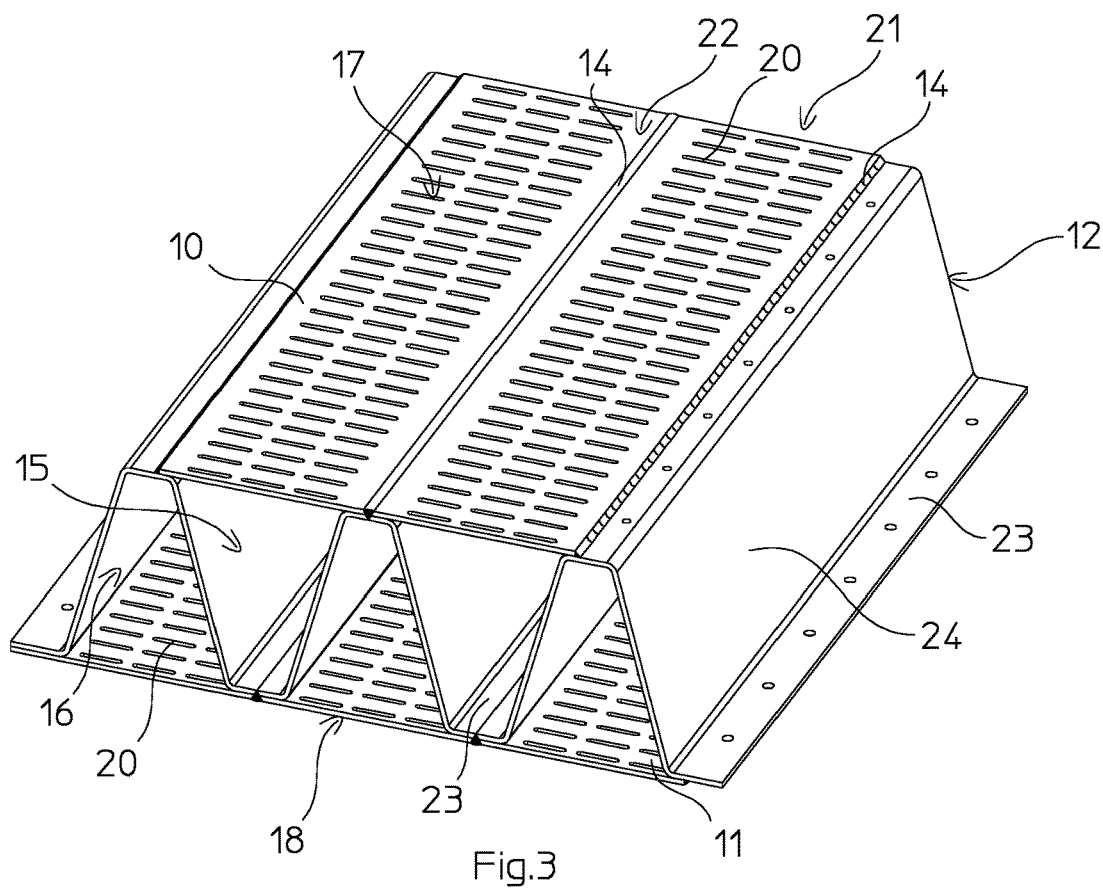
FIG. 3 shows a view of the collector bottom according to FIG. 2.

The design of the collector bottom 6, in a preferred embodiment, is shown in FIG. 3.

The walls 10 and 11 are essentially realized using metal sheets of suitable thickness (preferably 3-10 mm) and made gas-permeable by means of openings 20 distributed over the surface. The openings 20 of each wall are distributed in strips which correspond to the respective channels which must receive or supply the gas. There are also non-permeable strips in proximity of the joints with the core 12. In FIG. 3 it can be seen that the openings 20 of the wall 10 are distributed in strips 21 corresponding to the position of the first channels 15 and that the wall 10 comprises non-permeable strips 22 (i.e. without openings 20) in proximity of the joints 14.

The openings 20 may be dimensioned depending on the particle size of the catalyst, so as to provide a suitable section allowing the gas to pass through, but the catalyst particles to be retained. In variants of the invention, the gas-permeable wall may also be realized by means of a perforated metal sheet covered with a suitable meshwork or using other techniques for realizing collectors known per se.

The core 12 has flat portions 23 parallel to the walls 10 and 11 for performing welding, i.e. preferably automatic welding. Said core 12 also has inclined gas-impermeable faces 24 which bound the channels 15 and 16 and define a form having a trapezoidal cross-section of the said channels.

Figure 4:
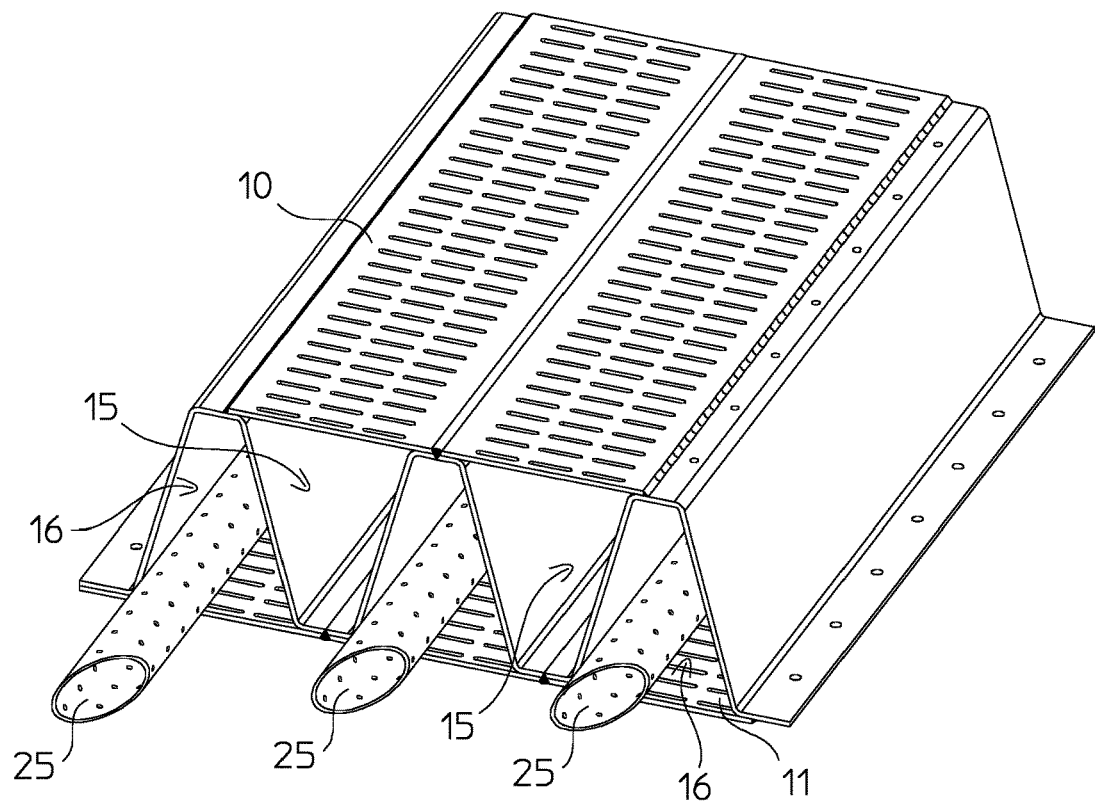
FIG. 4 shows a collector bottom as in FIG. 3, in another embodiment of the invention.

FIG. 4 shows a variant in which the collector bottom 6 comprises perforated tubes 25 inside the channels 16. Preferably a perforated tube 25 is provided inside each channel 16. The gas from the heat exchanger 5 is distributed inside the channels 16 via said tubes 25, obtaining a more uniform distribution along the entire length of the said channels. Another advantage of said perforated tubes 25 is that the gas is partly confined inside the tubes 25, thereby reducing the contact of the gas with the surfaces of the sides 24 and the parasitic heat exchange between the channels.

Figure 5:
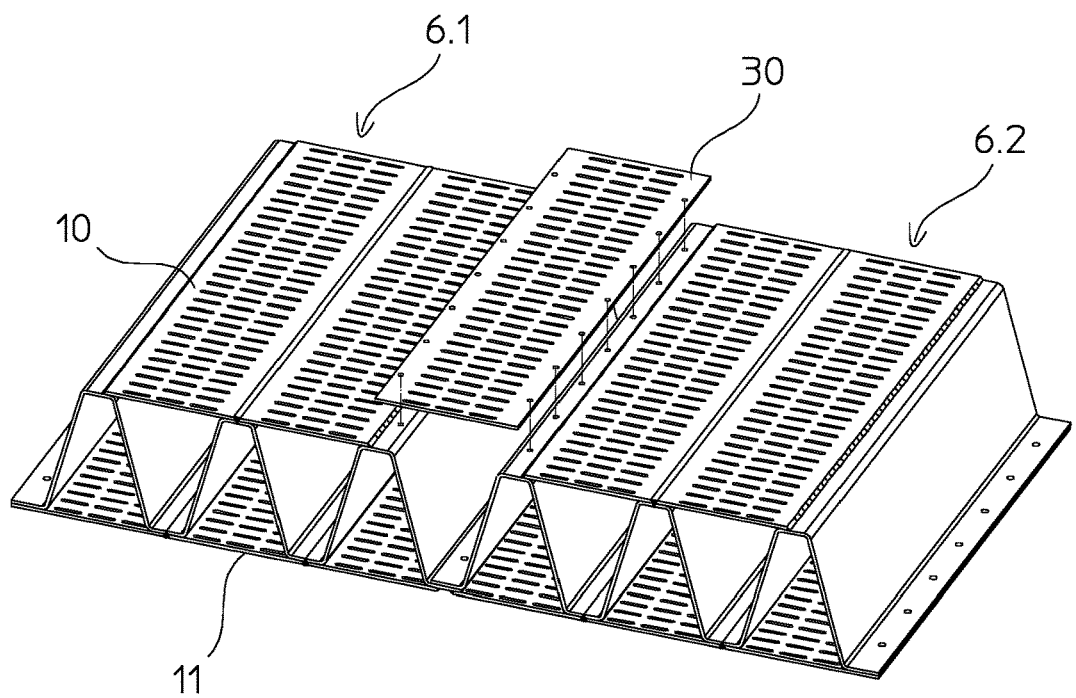
FIG. 5 shows a collector bottom in yet another embodiment of the invention.

FIG. 5 shows a variant of modular collector bottom 6. Two self-supporting modules 6.1 and 6.2 are shown, these being joined together by a platform 30 which forms part of one of the flat faces, for example the face 10, of the modular collector. The constructional design of the modules 6.1 and 6.2 is similar to that shown in FIGS. 2 and 3, optionally with perforated tubes as shown in FIG. 4.

Figure 6:
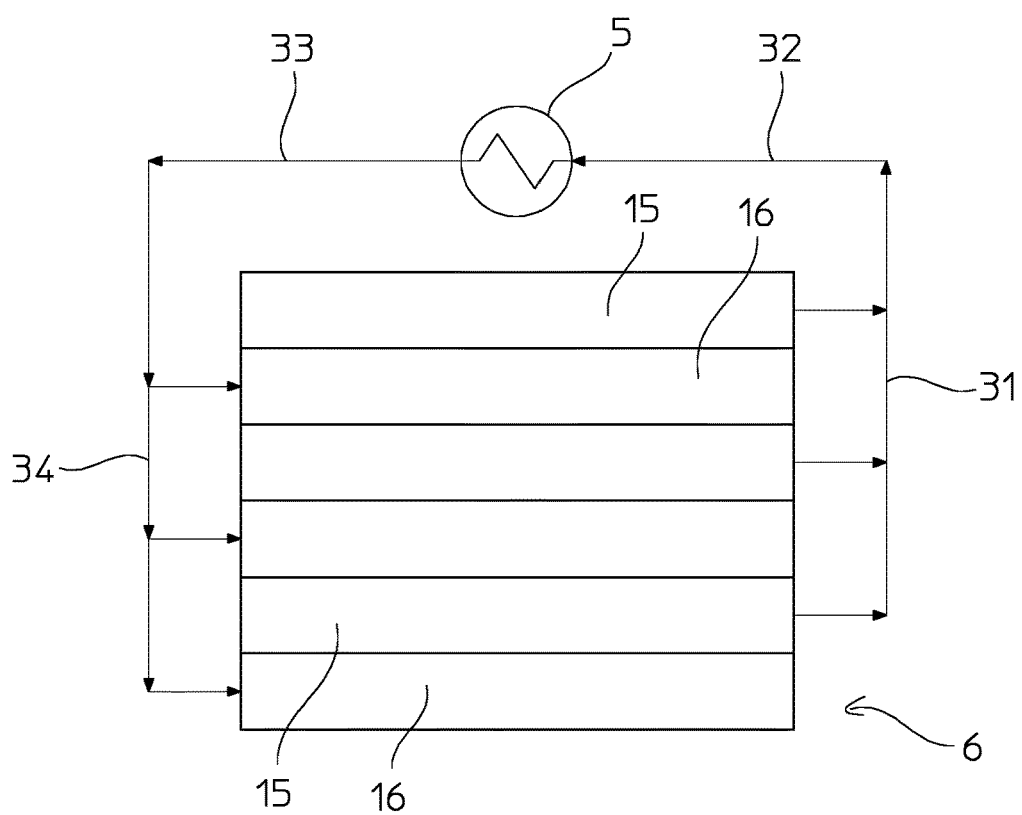
FIG. 6 is diagram showing the flows between the collector bottom and the heat exchanger of the reactor according to FIG. 1, in an embodiment of the invention.

FIG. 6 shows in schematic form the gas flow path. In particular the figure shows the flows between the collector bottom 6 and the heat exchanger 15. The gas collected in the first channels 15 is preferably fed to a first collector/distributor 31 and then to the heat exchanger 15 along the flow line 32. After passing through the exchanger 15, the gas (line 33) passes to a second collector 34 and from here flows into the second channels 16. The channels 15 are connected in parallel to the collector 31 and the channels 16 are connected in parallel to the second collector 34.

Some non-limiting examples of the reactor layout which can be usefully used with the invention are illustrated below. The examples provide an idea of the various possibilities of application of the invention.

Example 1

Figure 7:
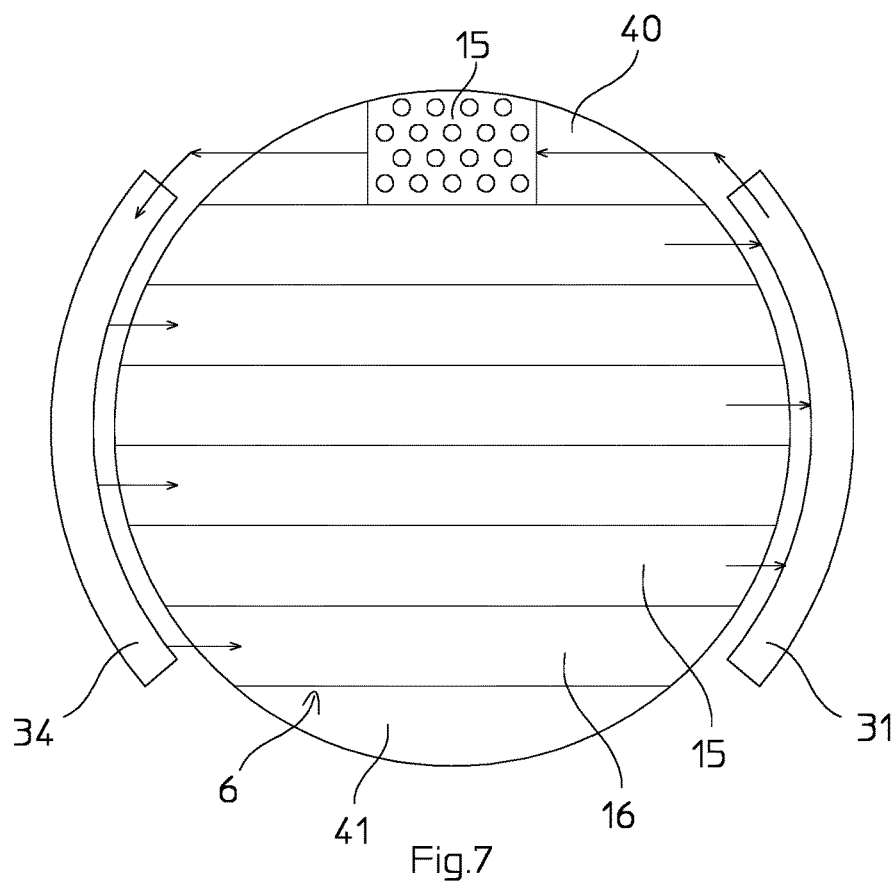
FIGS. 7 and 8 show a schematic cross-section of a reactor, in some embodiments of the invention.

In this example (FIG. 7) the reactor comprises, viewed in cross-section, a circular segment 40 which houses the heat exchanger 15 and a circular segment 41 which houses auxiliary services such as: thermocouples, piping, manholes, etc. It should be noted that, when adopting axial flow, a radial symmetry of the reactor is not necessary. Accordingly, the exchanger 15 and/or further services may be housed in circular segments such as the segments 40 and 41. The figure also shows the collectors 31 and 34 as per the diagram of FIG. 6. The exchanger 15 is shown as being of the tube type, but may also be of the plate type.

Example 2

Figure 8:
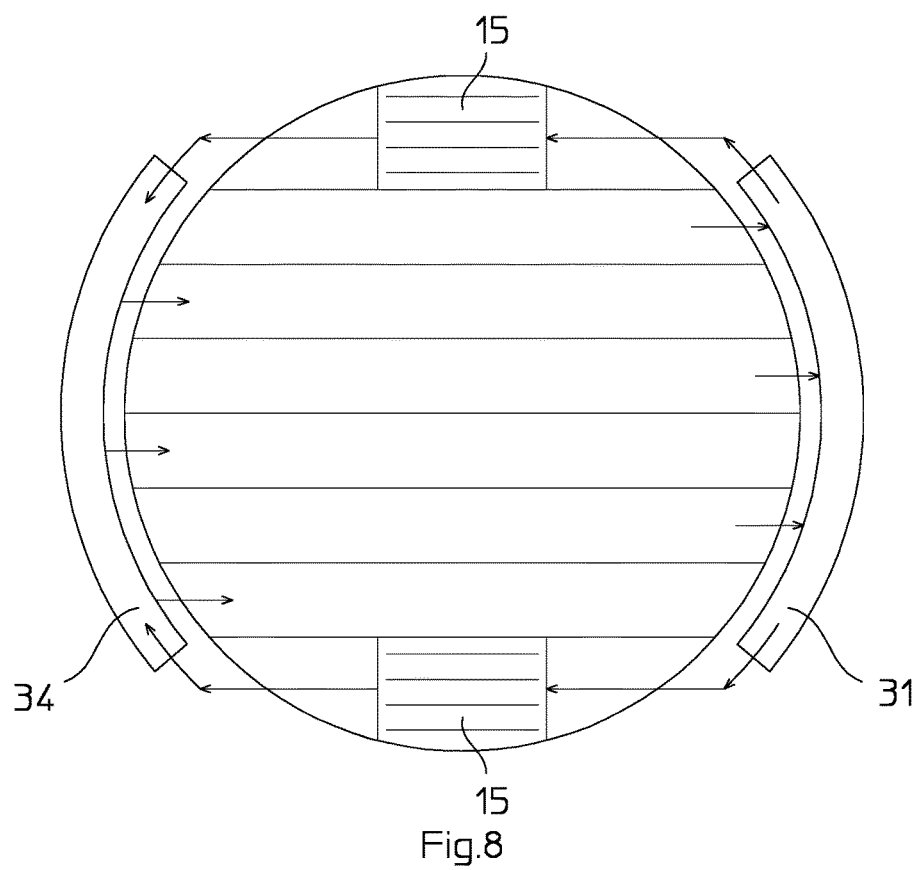

In this example, similar to the preceding example (FIG. 8), the reactor comprises two heat exchangers 15 in the circle segments 40 and 41.

Example 3

Figure 9:
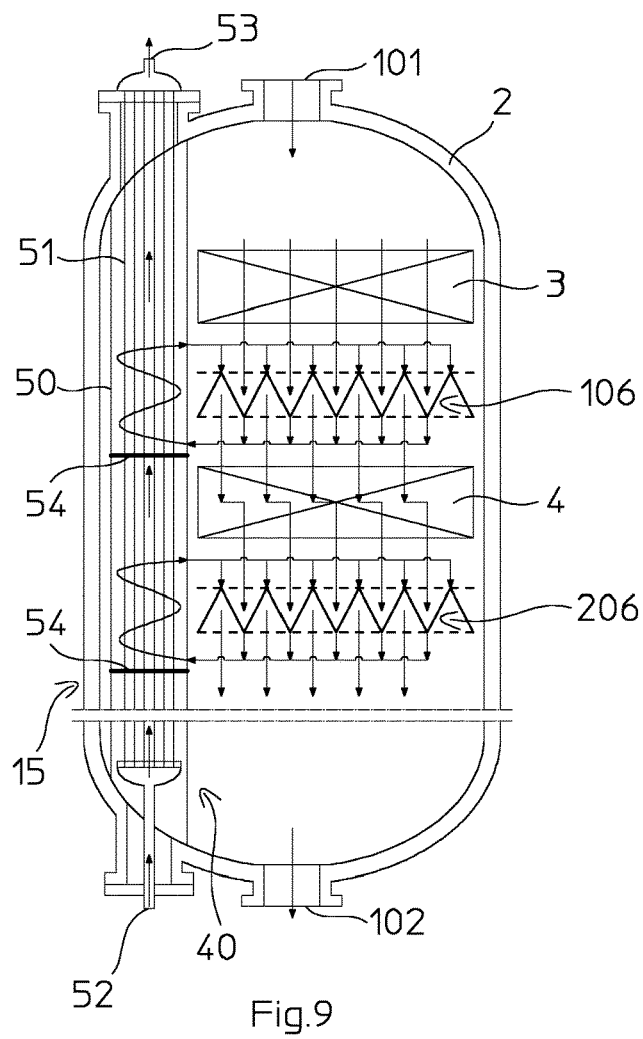
FIGS. 9 and 10 show a schematic longitudinal section of a reactor, in some further embodiments of the invention.

In this example (FIG. 9) the heat exchanger 15 is shown as a tube-type heat exchanger arranged offset in a circular segment 40 of the reactor.

The exchanger essentially comprises a shell 50 and a tube bundle 51. The process gas circulates on the shell side, while a cooling fluid circulates on the tube side, i.e. inside the tubes 51. Consequently, the shell 50 in this embodiment is of the "low-pressure" type, because it must withstand only the difference in pressure resulting from the head losses across the catalytic beds.

The cooling fluid on the tube side has an inlet 52 and outlet 53. Said cooling fluid may be a gas or more advantageously water for producing steam at a suitable pressure. The production of steam is advantageous because the temperature of the cooling fluid (boiling water) is kept constant.

The gas exiting the single beds may be conveyed on the shell side of one or more gas pre-heating exchangers, which are physically separate, or of a single boiler, whose tubes or plates pass along the whole length of the apparatus. In this latter case, shell-side partitions 54 must be provided in order to keep the gas of each single axial collector separate.

In order to simplify the architecture and the assembly/disassembly of the boilers, boilers may be provided with U-shaped tubes.

It can be noted that the reactor comprises two collector bottoms 106, 206 which are situated respectively below the first bed 3 and below the second bed 4. Said two collector bottoms are formed essentially in the same manner as the collector bottom 6 already described. It can be noted that the reactor comprises only two catalytic beds, and therefore the gas exiting the second collector 206 in this example flows out of the reactor instead of passing into another catalytic bed.

The reactor shown in the example has the following advantages: easy accessibility, free choice of the height of the catalytic beds, catalytic beds with a uniform cross-section, better use of the spaces inside the reactor (more compact apparatus), gas entering and exiting the beds without any transverse speed components. The absence of transverse speed components avoids undesirable displacements of the catalyst.

Example 4

In this example (FIG. 10) the heat exchanger 15 comprises a shell 60 and one or more tube bundles 61, 62. The process gas circulates on the tube side. The shell 60 is consequently of the "high-pressure" type. Other details are substantially similar to those of FIG. 9.

It should be noted that the shell 60 may have a non-circular cross-section. In one embodiment the cross-section of the shell 60 is shaped so as to follow the profile of the reactor circular segment 40.

It should be noted that the constructional design is facilitated by the fact that, for each collector, the gas inlet and outlet of the boiler shell are located at the same height.

The arrangement described forms a single high-pressure shell inside the reactor, where steam is generated.

Figure 10:
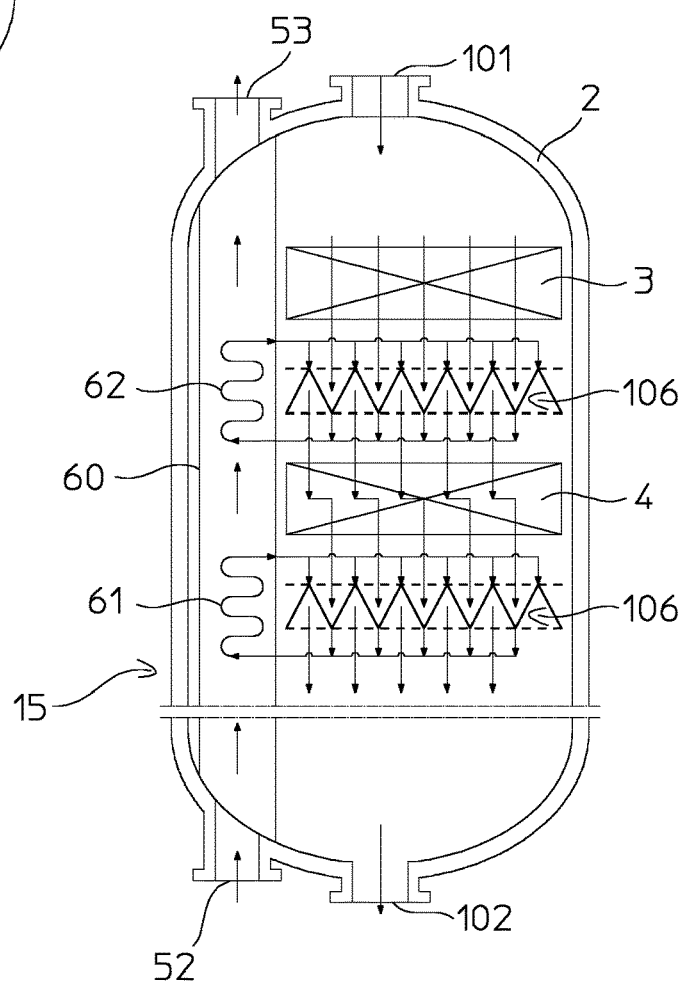

The reactor according to FIG. 10 may produce steam as in the isothermal methanol reactors of the radial or axial-radial type with exchanging bodies immersed in the catalyst, but it has a number of advantages compared to the latter. One advantage is the improved heat-exchange efficiency which is not impaired by the catalyst. Another advantage is that the components of the exchanger 15 may be inspected and repaired without having to unload the catalyst.

The invention claimed is:

1. A reactor for carrying out exothermic or endothermic chemical reactions, the reactor comprising:
   an axial stack of catalytic beds including at least a first catalytic bed and a second catalytic bed operating in series with axial flow, the first and second catalytic beds being stacked one next to the other in an axial direction of the reactor, wherein a gaseous flow exiting the first catalytic bed is subjected to a further reaction stage in the second catalytic bed; and
   at least one heat exchanger located sideways relative to the axial stack of catalytic beds, said at least one heat exchanger being arranged to cool or heat, via indirect heat exchange with a heating or cooling medium, said gaseous flow exiting the first catalytic bed before entry into the second catalytic bed;
   wherein the first catalytic bed has a collector bottom having a box-like structure, including a first wall and a second wall spaced and parallel with respect to each other, and a plurality of parallel channels that are defined between said first and second walls;
   wherein said first wall is exposed to the gaseous flow exiting the first catalytic bed, and the second wall communicates with a gas inlet of the second catalytic bed, and said first wall and second wall are gas-permeable at least over part of a surface thereof;
   wherein said plurality of parallel channels includes first channels that are in direct communication with the first wall so as to collect the gaseous flow exiting said first catalytic bed and passing through the first wall, and second channels that are in direct communication with the second wall so as to distribute a gaseous flow in said second catalytic bed through the second wall;
   wherein said at least one heat exchanger is an indirect heat exchanger with a first side traversed by the gaseous flow exiting the first catalytic bed and a second side traversed by a heat exchange fluid, said first side having an inlet communicating with the first channels of the collector bottom and an outlet communicating with the second channels thereof, so as to heat or cool the gaseous flow collected by the first channels and feed the gaseous flow, heated or cooled, to the second channels.

2. The reactor of claim 1, wherein said collector bottom includes a core element sandwiched between said first wall and second wall, the core element having a wave configuration with crests that are joined alternately to the first wall and the second wall, defining said plurality of parallel channels between the said first and second walls.

3. The reactor of claim 2, wherein said first wall includes a flat metal sheet, said second flat wall includes another flat metal sheet, and the core element includes an undulated or corrugated metal sheet.

4. The reactor of claim 1, wherein the first channels and the second channels of the collector bottom alternate with each other.

5. The reactor of claim 2, wherein the core element is a load-bearing element of the collector bottom.

6. The reactor of claim 1, wherein the first wall and the second wall of the collector bottom are gas-permeable owing to holes or micro holes, or owing to a presence of slots covered by a mesh.

7. The reactor of claim 1, wherein said plurality of parallel channels of the collector bottom have an essentially triangular or trapezoidal cross-section.

8. The reactor of claim 1, wherein said plurality of parallel channels of the collector bottom extend in a longitudinal direction that lies in a plane perpendicular to an axis of the reactor.

9. The reactor of claim 8, wherein the reactor has a vertical axis and the plurality of parallel channels are located at a same height inside the reactor.

10. The reactor of claim 1, wherein said collector bottom has a modular structure including modules, each of the modules of the modular structure including a given number of said plurality of parallel channels, and the combined collector bottom being formed by an arrangement side-by-side of two or more of said modules.

11. The reactor of claim 10, wherein adjacent ones of the modules of the collector bottom are fixed together by one or more flat elements that form portions of the first wall or the second wall.

12. The reactor of claim 1, wherein the collector bottom includes perforated tubes for collecting or distributing the gas inside the first and/or second channels.

13. The reactor of claim 1, wherein said at least one heat exchanger is inside the reactor.

14. The reactor of claim 1, wherein said at least one heat exchanger is of a tube type or of a plate type.

15. The reactor of claim 1, wherein the reactor is an axial or essentially axial flow reactor; the first catalytic bed and the second catalytic bed are vertically arranged in a column, the first bed being positioned above the second bed, so that the two beds are crossed in sequence by the axial flow, the collector bottom being arranged between the two beds.

* * * * *